United States Patent [19]

Noomen et al.

[11] 4,011,311

[45] Mar. 8, 1977

[54] APPLICATOR STICK

[75] Inventors: Arie Noomen, Voorhout; Pieter H. J. Schuurink, Noordwijk, both of Netherlands

[73] Assignee: Akzo N.V., Arnhem, Netherlands

[22] Filed: Apr. 18, 1974

[21] Appl. No.: 461,966

[30] Foreign Application Priority Data

Apr. 24, 1973 Netherlands .................... 7305664

[52] U.S. Cl. ............................... 424/65; 106/20; 106/22; 252/522; 260/77.5 AT; 260/453 AR; 260/468 E; 260/471 C; 424/DIG. 5; 424/78; 424/322

[51] Int. Cl.² .......................................... A61K 7/32

[58] Field of Search ............... 424/65, 322, DIG. 5, 424/78; 260/453, 471 C, 468 E, 77.5 AT; 106/20, 22; 252/522

[56] References Cited

UNITED STATES PATENTS

| 3,086,887 | 4/1968 | Habib .................... 117/139 |
| 3,576,776 | 4/1971 | Muszik et al. .................... 260/23 R |
| 3,605,764 | 9/1971 | Ehrlich .................... 106/22 X |
| 3,708,435 | 1/1973 | Starkman .................... 252/522 X |

FOREIGN PATENTS OR APPLICATIONS

| 1,482,914 | 4/1967 | France .................... 424/322 |
| 506,240 | 6/1971 | Switzerland .................... 424/322 |
| 1,230,884 | 5/1971 | United Kingdom .......... 424/DIG. 5 |

OTHER PUBLICATIONS

Degering An Outline of Organic Nitrogen Compounds, 1945, p. 303.
Saunders et al. Polyurethanes: Chemistry and Technology I. Chemistry, 1960, pp. 74 to 78.
Knorr et al. Deutsche Chem. Berichte, 1903, vol. 36, pp. 1278 to 1281.

*Primary Examiner*—Dale R. Ore
*Attorney, Agent, or Firm*—Stevens, Davis, Miller & Mosher

[57] ABSTRACT

A gel type applicator stick of adhesive, deodorant or other dispersoid containing in percentages by weight from 0.01 to 45% dispersoid, 10 to 90% water or aqueous solvent and from 5 to 40% of a gel forming agent which is a reaction product of an automatic diisocyanate having 8 to 30 carbon atoms and a monoalkanolamine or dialkanolamine having 2 to 16 carbon atoms.

18 Claims, No Drawings

APPLICATOR STICK

This invention relates to a stick or the like containing a water-soluble or water dispersible component to be applied to a surface and as a shaping substance a gel prepared from a gel-forming compound in water with which there may be mixed an organic solvent.

According to British Pat. Specification No. 1,230,884, a stick of the above type is used as an adhesive stick which contains an adhesive as the constituent to be applied and an alkali metal or ammonium salt of an aliphatic carboxylic acid with 8 to 36 carbon atoms as a gel forming compound.

It is an object of the present invention to provide a stick prepared from a novel and improved gel-forming compound which may be used as an adhesive stick, writing or drawing sticks, wall paint repair sticks, deodorant sticks, odor or perfume sticks or other cosmetic sticks made with the use of, for instance, dyes and/or pigments, pigment pastes, anti-perspiration agents, odorants and scenting agents as the constituents to be applied with the stick. Another object is to provide a shaped gel containing a material such as an adhesive, deodorant or the like to be applied to a surface by rubbing the gel over the surface.

The objects of the invention are accomplished by providing a stick of the kind described containing an adhesive or other material to be applied to a surface and as the gel-forming compound the product of a reaction of:

a. an aromatic diisocyanate having 8 to 30 carbon atoms with b. a mono- and/or dialkanolamine having 2 to 16 carbon atoms; the stick containing from 5 to 40% by weight of the gel-forming compound, 10 to 90% by weight of water and, if desired, an organic solvent, and 0.01 to 45% by weight of the component to be applied to the surface, all percentages by weight being calculated on the sum of the three aforementioned components.

Any suitable aromatic diisocyanate having 8 to 30 carbon atoms in which the two isocyanate groups are directly bound to an aromatic ring system may be used. Examples of suitable aromatic diisoyanates are 2,4- and 2,6-toluene diisocyanate, naphthylene-1,5-diisocyante, 4,4'-diphenyldiisocyanate, 3,3'-dimethyl4,4'-diphenylmethanediisocyanate, 3,3'-dimethoxy-4,4'-diphenyldiisocyanate, 3,3'-diphenyl-4,4'-diphenyldiisocyanate, diphenylmethane diisocyanate, 3,3'-dimethyl-4,4'-diphenyldiisocyanate and the like. It is preferred to use an aromatic diisocyanate with 8 to 16 carbon atoms, more particularly 2,4- and/or 2,6-toluene-diisocyanate.

Any suitable mono- or dialkanolamine may be used such as, for example, monoethanolamine, monoisopropanolamine, monopropanolamine, diethanolamine, cyclohexylethanolamine and cyclooctylisopropanolamine. It is preferred to use a mono- or dialkanolamine with 2–8 carbon atoms; more particularly a monoalkanolamine with 2 to 4 carbon atoms such as monoethanolamine, monoisopropanolamine and the like. Alternatively, use may of course be made of mixtures of organic isocyanates and/or mono- or dialkanolamines.

The ratio between the organic isocyanate and the alkanolamine in which these compounds are allowed to react with each other is preferably so chosen that at least 1 and not more than 2 active hydrogen atoms determinable by the Zerewitinoff method of the alkanolamine react with an isocyanate group; but higher or lower ratios also may be used. Other gel forming compounds may be used with the gel forming compound provided by the invention.

The gel forming compound used for the preparation of the shaping gel is generally prepared in situ in water, which water may be mixed with an organic solvent. Although for the sake of economy it would be preferable only to use water as a dispersion medium, it is for practical reasons preferred to employ a mixture of water and a water miscible organic solvent. Examples of suitable organic solvents are alcohols such as methanol, ethanol, isopropanol, n-butanol, tert.butyl alcohol, ethylene glycol, monopropylene glycol, dipropylene glycol, polyethylene glycol, polypropylene glycol and glycerol; and ketones such as acetone and methylethyl ketone. The composition of the stick will in practice generally be chosen so that a mass is formed which is not too soft or too hard but is readily abraded when it is applied. To this end the stick according to the invention generally contains 5 to 40% by weight of the gel forming compound, 10 to 90% by weight of water with, if desired, an organic solvent, and 0.01 to 45% by weight of the component to be applied. By preference the percentages of the three basic components are 10 to 30% by weight, 30 to 75% by weight and 0.05 to 30% by weight, respectively. All percentages by weight are calculated on the sum of the three aforementioned components.

For use in a stick to be employed as an adhesive stick any suitable component to be applied with the stick may be chosen, for instance: polymers of acrylamide in combination, if desired, with N-alkyl-acrylamide, salts of polyacrylic or methacrylic acid, polyvinyl acetate, copolymers of ethylene and vinyl acetate, polyvinyl alcohol, polyvinyl methyl ether, polychloroprene, styrene-butadiene copolymers, butadiene-acrylonitrile copolymers and natural rubber. It is preferred to use polyvinyl pyrrolidone with a molecular weight in the range of 25,000 to 400,000. Also mixtures of adhesives may be employed. By preference, an adhesive stick according to the invention contains 5 to 40% by weight of the gel forming compound, 10 to 90% by weight of water mixed, if desired, with the organic solvent, and 3 to 45% by weight of the adhesive, all percentages being calculated on the sum of the three aforementioned components.

For other applications the stick contains other compounds mentioned for these purposes.

In addition to the basic components, the stick may, for instance, contain a plasticizer, a moisture retaining agent and a gel stiffening agent, for instance, glycerol, sorbitol, mannitol, polyethylene glycol, tri- and tetraethylene glycol, surface active compounds, odorants and dyes or pigments.

With the aid of the adhesive stick according to the invention, the desired amount of adhesive may be applied to either or both of the surfaces to be adhesively bonded together. The surface onto which an object if glued may for instance be of paper, leather, wood, synthetic film, or some textile material. One of the surfaces to be bonded should preferably be porous. It is not necessary to apply adhesive to both surfaces. For instance, articles of paper, sach as photographs and invoices, and of metal foil can easily be glued onto any substrate. Upon application of the adhesive immediate bonding is obtained, but the drying time is sufficiently long to allow the glued object to be shifted into its proper position.

The following examples serve to further illustrate the invention, but do not limit the scope thereof. The hardness is measured with a penetrometer, use being made of an ASTM standard needle having a weigth of 2.5 g (see ASTM Standard D 1321) loaded with an additional weight of 47.5 g. The testing time is 5 seconds. The hardness is expressed to the nearest tenths of a millimeter depth of penetration of the needle.

EXAMPLE 1

Into a flask provided with a stirrer are successively admitted 13 g water, 14 g glycerol, 28 g ethanol and 30 g polyvinyl pyrrolidone having a molecular weight of about 40,000. Subsequently, 6.8 g monoethanolamine are added, with stirring, and the stirring is continued until a homogeneous mass has formed. Next, 8.2 g toluene diisocyanate are added, with stirring, and the resulting mass is stirred for a few more minutes. After the mass has been cooled, the gel obtained has a hardness of 395.

EXAMPLE 2

Example 1 is repeated, except that use is made of 20 g water, 15 g glycerol, 20 g ethanol, 27.5 g polyvinyl pyrrolidone having a molecular weight of about 40,000 and 8.0 g momoethanolamine and 9.5 g toluene diisocyanate. The hardness of the resulting stick is 247.

EXAMPLE 3

Example 2 is repeated, except that use is made of 6.1 g isopropanolamine and 11.4 g technical diphenyl methane diisocyanate (commerically available under the trade name "Desmodur VL"). The hardness of the stick is 48.

EXAMPLES 4-7

Example 1 is repeated, except that this time use is made of the components listed in Table 1 in the amounts mentioned therein. The hardness values of the adhesive sticks are also indicated.

Table 1

| Compounds | Example 4 | Example 5 | Example 6 | Example 7 |
| --- | --- | --- | --- | --- |
| Water | 41.4 | 43.4 | 42.0 | 40.6 |
| Ethanol | 9.4 | 6.2 | 6.0 | 5.8 |
| Monopropylene glycol | 13.0 | 12.4 | 12.0 | 11.6 |
| Polyvinyl pyrrolidone | 20.0 | 20.0 | 20.0 | 20.0 |
| Monoethanolamine | 7.4 | 8.2 | 9.1 | 10.0 |
| Toluene diisocyanate | 8.8 | 9.8 | 10.9 | 12.0 |
| Hardness | 251 | 117 | 77 | 14 |

EXAMPLE 8

In a similar way as described in Example 1, a color dispensing writing or drawing stick is made by mixing the following compounds in the amounts by weight indicated.

| | |
| --- | --- |
| Water | 40 |
| Ethanol | 15 |
| Polyvinyl alcohol | 20 |
| Water-soluble dye ("Supracen blue FFR") | 5 |
| Monoethanolamine | 9.1 |
| Toluene diisocyanate | 10.9 |

EXAMPLE 9

In a similar way as described in Example 1, a color dispensing stick for painting purposes of the do-it-yourself line is made by mixing the following compounds in the amounts by weight indicated.

| | |
| --- | --- |
| Water | 30 |
| Ethanol | 5 |
| Monopropylene glycol | 15 |
| Pigment color paste | 20 |
| Polyvinyl acetate dispersion | 10 |
| Monoethanolamine | 7.8 |
| Toluene diisocyanate | 10.6 |

EXAMPLE 10

In a similar way as described in Example 1, a deodorant stick is made by mixing the following compounds in the amounts by weight indicated.

| | |
| --- | --- |
| Polyethylene glycol oleate | 4 |
| Diethylene glycol monoethyl ether | 5 |
| Propylene glycol | 20 |
| Ethanol | 5 |
| Water | 4 |
| Trichlorcarbanilide | 0.1 |
| Perfume oil | 0.9 |
| Monoethanolamine | 8.25 |
| Toluene diisocyanate | 11.75 |

Although the invention has been described in detail for the purpose of illustration, it is to be understood that such detail is solely for that purpose and that variations can be made therein by those skilled in the art without departing from the spirit and scope of the invention except as it may be limited by the claims.

What we claim is:

1. A shaped gel applicator containing a water dispersible material to be applied to a surface by rubbing the gel over the surface which comprises
   a. 5% to 40% by weight of a gel which is the reaction product of an aromatic diisocyanate having 8 to 30 carbon atoms, the isocyanate groups of the diisocyanate being bonded directly to an aromatic ring, with a mono- alkanolamine or dialkanolamine having 2 to 16 carbon atoms;
   b. 10% to 90% by weight of water or a water and water miscible organic solvent mixture; and
   c. 0.01% to 45% by weight of said material to be applied to the surface. all percentages by weight being calculated on the sum of the three aforementioned components.

2. The stick of claim 1 wherein the gel forming compound is the product of a reaction of an aromatic diisocyanate with 8 to 16 carbon atoms with the alkanolamine.

3. The stick of claim 2 wherein the gel forming compound is the product of a reaction of 2,4-toluene diisocyanate or 2,6-toluene diisocyanate with the alkanolamine.

4. The stick of claim 1 wherein the gel forming compound is the product of a reaction of the aromatic diisocyanate with a mono-alkanolamine or dialkanolamine having 2 to 8 carbon atoms.

5. The stick of claim 1 wherein the gel forming compound is the product of a reaction of the aromatic diisocyanate with a monoalkanolamine with 2 to 4 carbon atoms.

6. The stick of claim 5 wherein the monoalkanolamine is monoisopropanolamine.

7. The stick of claim 5 wherein the monoalkanolamine is monoisopropanolamine.

8. The stick of claim 1 wherein the stick device contains 10 to 30% by weight of the gel 30 to 75% by weight of water or a water-organic solvent mixture and 0.05 to 30% by weight of the component to be applied to a surface, all percentages by weight being calculated on the sum of the three aforementioned components.

9. The stick of claim 1 wherein the component to be applied to a surface is an adhesive.

10. The adhesive stick of claim 9 wherein the stick device contains 5 to 40% by weight of the gel 10 to 90% by weight of water or a water-organic solvent mixture and 3 to 45% by weight of the adhesive, all percentages being calculated on the sum of the three aforementioned components.

11. The stick of claim 1 wherein the stick device contains a pigment or a dye.

12. The stick of claim 1 wherein the stick device contains an anti-perspirant.

13. The stick of claim 1 wherein the stick device contains an odorant or scenting agent.

14. The applicator of claim 1 wherein (c) is an adhesive, deodorant, paint, cosmetic, dye, pigment or anti-perspirant.

15. The applicator of claim 1 wherein the diisocyanate is 2,4-toluene diisocyanate or 2,6-toluene diisocyanate or a mixture thereof and the alkanolamine is monoethanolamine, monoisopropanolamine, monopropanolamine, diethanolamine, cyclohexylethanolamine or cyclooctylisopropanolamine.

16. The applicator of claim 15 wherein the ratio of diisocyanate to alkanolamine provides from 1 to 2 active hydrogen atoms of th alkanolamine to react with an isocyanato group.

17. The applicator of claim 16 wherein (b) is water.

18. A stick-type gel applicator adapted for coating a surface with a dispersoid by rubbing a gel over a surface comprising
   a. from about 0.01 to 45% of the dispersoid dispersed in
   b. from about 5 to 40% of a gel which comprises the reaction product of a diisocyanate having a isocyanato groups attached directly to an aromatic ring containing from 8 to 30 carbon atoms and a mono-alkanolamine or dialkanolamine having from 2 to 16 carbon atoms, and
   c. from about 10 to 90% by weight water or a water-organic solvent mixture.

* * * * *

UNITED STATES PATENT AND TRADEMARK OFFICE
CERTIFICATE OF CORRECTION

PATENT NO. : 4,011,311
DATED : March 8, 1977
INVENTOR(S) : ARIE NOOMEN et al

It is certified that error appears in the above-identified patent and that said Letters Patent are hereby corrected as shown below:

Abstract, line 5, change "automatic" to ---aromatic---.

Column 2, line 65, change "sach" to ---such---.

Claim 6, line 2, change "monoisopropanolamine" to

---monoethanolamine---.

Signed and Sealed this

Eleventh Day of October 1977

[SEAL]

Attest:

RUTH C. MASON
Attesting Officer

LUTRELLE F. PARKER
Acting Commissioner of Patents and Trademarks